United States Patent Office 3,476,810
Patented Nov. 4, 1969

3,476,810
CATALYTIC OXIDATION OF OLEFINS TO ALDEHYDES
Enrico Cavaterra, Saronno, Varese, and Natale Ferlazzo, Milan, Italy, assignors to Montecatini Edison S.p.A., Milan, Italy
No Drawing. Filed May 29, 1967, Ser. No. 642,213
Claims priority, application Italy, June 3, 1966, 18,652
Int. Cl. C07c *45/02;* B01j *11/74*
U.S. Cl. 260—604               10 Claims

ABSTRACT OF THE DISCLOSURE

A process for the preparation of an $\alpha, \beta$-unsaturated aldehyde, by reacting at elevated temperatures an olefin and a member selected from the group consisting of oxygen and an oxygen-containing gas in the presence of a catalyst comprising an oxygenated tellurium compound and an oxygenated cerium compound.

BACKGROUND OF THE INVENTION

The present invention relates to an improved catalytic process for the preparation of $\alpha, \beta$-unsaturated aldehydes, more particularly, the present invention re-rates to the preparation of acrolein and methacrolein.

In our Italian Patent No. 693,086 a process is described wherein an olefin is reacted with oxygen in the presence of specific catalysts for the production of $\alpha, \beta$-unsaturated aldehydes.

THE INVENTION

It has now been found that this process may also be carried out, again starting with a gaseous mixture comprising a straight or branched chain olefin having up to 4 carbon atoms and oxygen or an oxygen containing gas by using a specific catalyst, as hereinunder described and exemplified The catalyst of the present invention is comprised of tellurium, cerium and oxygen, in an atomic ratio Te/Ce ranging from 10:1 to 1:1, while the oxygen is present in the quantity necessary for maintaining said elements in the form of their oxides. Said elements may be present in the catalyst either in the form of oxides or in the form of one or more oxygenated compounds or mixtures of oxides and oxygenated compounds.

This catalyst turned out to be effective both when used alone and when suitably supported on conventional carriers and it may be used in fixed bed as well as in fluid bed.

The process according to the present invention may be applied to propylene to produce acrolein and to isobutylene to produce methacrolein.

Use of a pure olefin is preferred, but it has been found that the process may be carried out in the presence of paraffinic hydrocarbons which are inert at reaction conditions and which further act as diluents.

Furthermore, the oxygen necessary for the reaction may be supplied either alone or in admixture with gases containing the same, such as, for example, air.

The quantity of oxygen or of the gases containing oxygen which may be used with respect to the olefin may vary within wide limits. The molar ratio oxygen: olefin is preferably comprised in the range of from about 0.5:1 to about 3.5:1.

Usually the reaction is carried out at a pressure around atmospheric pressure, but it may be also carried out at superatmospheric pressures.

The reaction temperatures may vary between 350° and 550° C., but temperatures comprised between 400° C. and 500° C. are preferable, since high conversions are thus attained, and additionally, only relatively short contact times are required.

Contact times may also vary within wide limits, such as, for example, in the range of from 0.05 to 20 seconds, but, in practice, it has been found that with the catalyst according to this invention the preferred contact times range from 0.1 to 10 seconds.

The catalyst according to this invention is prepared with a ratio between active part and carrier which preferably is variable within the range of from 10% to 50% by weight of active part, calculated as the sum of the oxides at the maximum valency and in the range of from 90% to 50% by weight of the carrier.

Various substances, such as, for instance, silica, alumina, alundum, fireclays and the like, may be used as a carrier, either in the form of suitably granulated powders or as granules, as well as gels of silica and alumina.

Particularly good results have been achieved by using a carrier constituted of microspheroidal macroporous silica of commercial type.

In the present patent application the terms hereunder used have the following meaning:

Percent conversion of olefin =

$$\frac{\text{moles of olefin reacted}}{\text{moles of olefin fed}} \times 100$$

Net yield or selectivity = Percent yield of the product X with respect to the converted olefin =

$$\frac{\text{weight of carbon atoms in the product X}}{\text{weight of carbon atoms in the converted olefin}} \times 100$$

Gross yield = Percent yield of the product X with respect to the olefin fed =

$$\frac{\text{weight of carbon atoms in the product X}}{\text{weight of carbon atoms in the olefin fed}} \times 100$$

Contact time: The contact time is defined as the time during which one unit volume of the gaseous mixture fed measured under the average temperature and pressure conditions existing in the reactor, remains in contact with one apparent unit volume of catalyst.

In order to further illustrate the present invention and the advantages thereof, the following specific examples are given, it being understood that the same are merely intended to be illustrative and not limitative.

EXAMPLE 1

The catalysts hereunder exemplified, according to the instant invention, were prepared with a fixed ratio between active component and carrier: more exactly 25% by weight of active part calculated as the sum of the oxides and 75% by weight of a carrier constituted by a macroporous microspheroidal silica of commercial type.

A method of preparation is described in general hereunder, while in the following table there are reported the quantities of reagents used for the preparation of single catalysts characterized by a particular atomic ratio between tellurium and cerium.

Under (a) there are indicated the grams of cerous nitrate $Ce(No_3)_3 \cdot 6H_2O$ and under (b) the grams of telluric acid $H_2TeO_4 \cdot 2H_2O$ which were dissolved in (c) ml. of water and (d) ml. of nitric acid at 65%. The volume of the resulting solution was then adjusted with water to a value equal to the volume of the pores of (e) g. of the silica carrier and, subsequently, the resulting solution was used to impregnate the (e) g. of silica.

For the actual impregnation, the solution was slowly poured onto the silica under stirring; it was stirred again for about 1 hour, and it was then left to settle for 8 hours, thence it was dried at 110°–120° C. for 12 hours and activated in air at 500° C. for 8 hours.

| Catalyst atomic ratio Te/Ce: | (a) | (b) | (c) | (d) | (e) |
|---|---|---|---|---|---|
| 9/1 | 7.8 | 36.7 | 40 | 10 | 91.4 |
| 3/1 | 15.6 | 24.5 | 25 | 10 | 73.6 |
| 2/1 | 21.7 | 23 | 45 | 10 | 76.4 |

EXAMPLE 2

4.5 cm.³, equal to about 2.7 g. of a catalyst prepared according to Example 1, were introduced as a fixed bed into a reactor constituted substantially by a suitably heated steel pipe. A gaseous mixture of propylene and air in the resepctive molar ratio of 1:10 was permitted to flow over the catalyst. The contact time was 2.5 seconds under atmospheric pressure. The reaction products were analyzed by means of gas-chromatographic analysis. At different temperatures, the following results were found:

| Catalyst atomic ratio Te/Ce: | Reaction temperature, ° C. | Percent propylene conversion | Percent net yield acrolein | Percent gross yield acrolein |
|---|---|---|---|---|
| 9/1 | 400 | 18.4 | 63.5 | 11.7 |
|  | 440 | 51 | 60 | 30.6 |
| 3/1 | 400 | 31.3 | 74.7 | 23.4 |
|  | 440 | 55.7 | 65.4 | 36.4 |
| 2/1 | 400 | +30.2 | 76.3 | 23 |
|  | 440 | 57.8 | 64.2 | 37.1 |

It has been remarked that by operating in the same way, but with the catalyst in the condition of a fluidized bed, completely similar results were obtained.

As many apparently widely different embodiments of the present invention can be made without departing from the spirit and scope thereof, it is to be understood that the same is not intended to be limited to the specific embodiments thereof, except as defined in the appended claims.

What is claimed is:

1. A process for the conversion of an olefin selected from the group consisting of propylene and isobutylene to acrolein and methacrolein, respectively, comprising contacting a mixture of the said olefin and elemental oxygen in the gaseous phase at a temperature of from about 350° C. to about 550° C., with an active catalyst consisting essentially of a mixture of the oxides of tellurium and the oxides of cerium.

2. The process as defined by claim 1, where in the tellurium:cerium atomic ratio in the catalyst ranges from between about 10:1 to about 1:1.

3. The process as defined by claim 2, wherein the ratio of elemental oxygen to olefin in the reaction mixture ranges from between about 0.5:1 to about 3.5:1.

4. The process as defined by claim 3, wherein the contacting time ranges from between about 0.05 second to about 20 seconds.

5. The process as defined by claim 4, wherein the reaction is conducted in fluid bed.

6. The process as defined by claim 4, wherein the reaction is conducted in the presence of an inert diluent.

7. The process as defined by claim 4 wherein the active catalyst is associated with from about 90% to about 50% by weight of a catalyst support.

8. The process as defined by claim 7, wherein the support is selected from the group consisting of silica, alumina, alundum and fireclay.

9. The process as defined by claim 8, wherein the support is microspheroidal macroporous silica.

10. The process as defined by claim 4, wherein the contacting time ranges from between about 0.1 second to about 10 seconds, at a temperature of from about 400° C. to about 500° C., and at a pressure of about atmospheric.

References Cited

FOREIGN PATENTS 1,372,397   8/1964   France.

LEON ZITVER, Primary Examiner

R. H. LILES, Assistant Examiner

U.S. Cl. X.R.

252—439, 454